Jan. 9, 1945.  T. EARLE  2,366,711
METHOD AND APPARATUS FOR MANUFACTURING GRAIN PRODUCTS
Filed Jan. 13, 1942

INVENTOR:
THEODORE EARLE
BY Tower J. Sweet
ATTORNEY

Patented Jan. 9, 1945

2,366,711

UNITED STATES PATENT OFFICE 2,366,711

METHOD AND APPARATUS FOR MANUFACTURING GRAIN PRODUCTS

Theodore Earle, Pacific Palisades, Calif.

Application January 13, 1942, Serial No. 426,586

2 Claims. (Cl. 83—28)

This invention relates to the treatment of certain cereal grains, notably wheat, rye, and barley, for the detachment and separation therefrom of certain exterior elements which adversely affect ultimate food products processed from such grain, and has as an object to provide an improved method operable to the end set forth.

A further object of the invention is to provide an improved method for the rapid, efficient, and economical decortication of certain cereal grains, such as wheat, rye, and barley.

A further object of the invention is to provide an improved method for the peeling of outer coat material from certain cereal grains, such as wheat, rye, and barley, without material damage to or destruction of the natural grain conformation and the nutritive values associated therewith.

A further object of the invention is to provide an improved method for the peeling of certain cereal grains which permits such control of the factors affecting grain decortication as may be necessary or desirable for efficient results.

A further object of the invention is to provide an improved method for the peeling of certain cereal grains under controlled conditions of effective pressure and surface moisture such as are best suited to effect the results sought in a given instance.

A further object of the invention is to provide improved means wherethrough my novel method may be given practical effect.

A further object of the invention is to provide apparatus of modified rod mill type adapted for the peeling of certain cereal grains under controlled conditions of pressure and moisture in accordance with the principles of my improved method.

Figure 1:
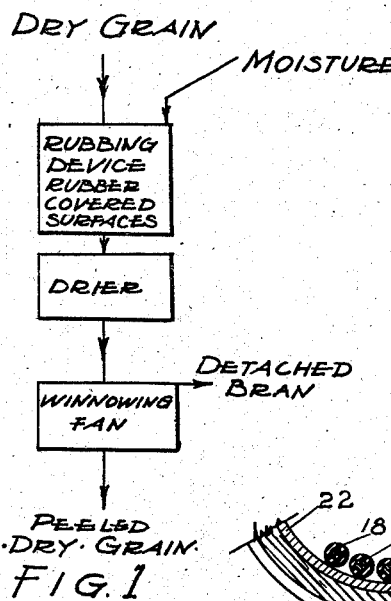
Figure 3:
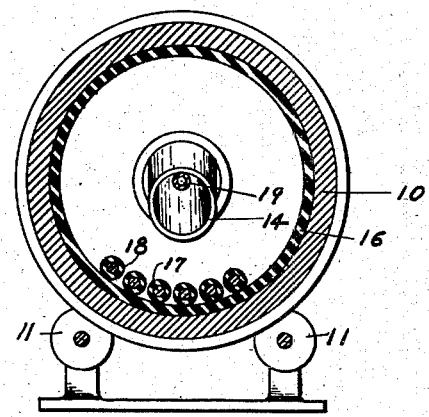
Figure 4:
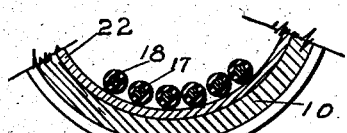
Figure 5:
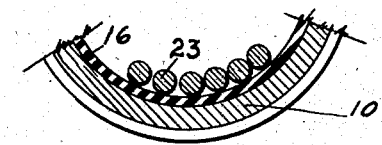
Figure 2:
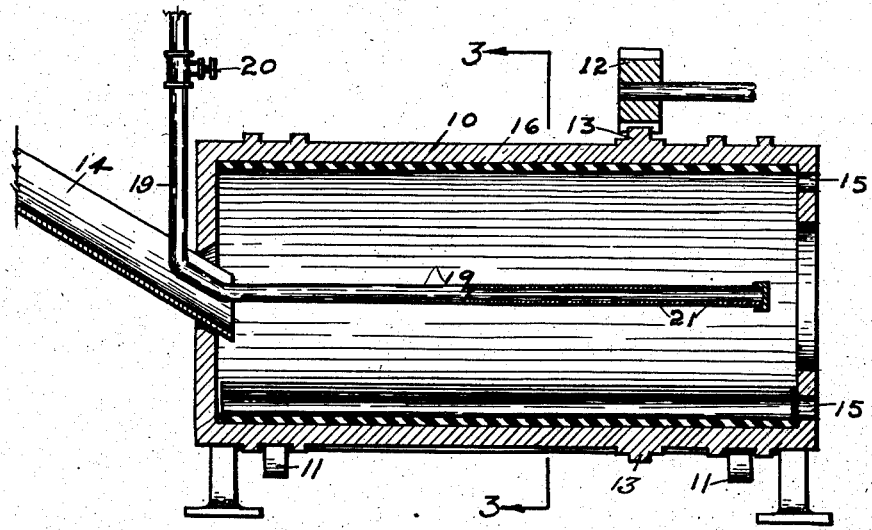

My invention consists in the character and sequence of specific steps, and in the construction and operative combination of apparatus, hereinafter set forth, pointed out in my claims, and illustrated by the accompanying drawing, in which:

Figure 1 is a diagram illustrating the character and sequential relation of specific steps constituting my improved method. Figure 2 is a vertical section taken axially through apparatus of rod mill type as modified for efficient practice of the improved method. Figure 3 is a cross section taken on the indicated line 3—3 of Figure 2. Figure 4 is a fragmentary detail section similar to Figure 3 illustrating an alternative construction and arrangement of the elements shown in the latter figure. Figure 5 is a view similar to Figure 4 wherein is illustrated a further alternative construction and arrangement of elements.

As is fully set forth in my Patent No. 2,232,697, and pending application Serial No. 378,677, certain of the cereal grains, notably wheat, rye, and barley, have a structural organization wherein the nutritive and advantageous food values are enveloped within and protected by an outer coat or closed shell which is of negative food value. The epidermal layer commonly found on such cereal grains is tough and woody in character, unpalatable as to flavor, apparently lacking in vitamin content, and appears to either carry or be directly associated with the enzymes or like factors productive of rancidity which adversely affect the keeping qualities of food products processed from such grains, hence detachment and removal of such epidermal layer from the grain berries without loss of, damage to, or destruction of the nutritive elements of the berry is an objective of material consequence.

Conventional milling processes commonly remove all of the outer coat material from grain berries through dry, abrasive action which carries away with the epidermal layer the underlying bran coat laminations possessed of substantial nutritive value and high vitamin content, and such conventional processes are commonly productive of damage to the desired grain material and are wasteful in the amount of the desired grain material abraded from the berries and removed with the outer coat material.

The improved process hereinafter described is designed to obviate the disadvantages of such practices in a simple, economical, and effective manner.

Other processes for removal of the epidermal layer wrinkle and loosen said layer by conditioning the grain in water, and subsequently detaching said layer through the attritive effects deriving from circulation of the conditioned grain in a body of water, or by rubbing the subsequently-dried conditioned grain between attritive or abrasive surfaces. Such methods are susceptible of improvement in the timing of conditioning and peeling operations for the selective removal of epidermal layers without material damage to the grain berries or removal with the epidermal layer of underlying bran coat material sought to be retained; and such improvement in timing is procurable by the practice of the invention herein disclosed.

The improved method, as herein illustrated, is characterized by subjection of the individual grain berries to be peeled to a moderate, attritive, rubbing action imposed through resilient surfaces of adherescent character in contact with the grain berries under a degree of pressure sufficient to positively rub the epidermal layer from the berries without crushing, breaking, or overheating of the berries so treated, and simultaneous maintenance of the grain berries, during the rubbing operation, in that externally-moist condition best suited to wrinkle and initially loosen the epidermal layer sought to be removed. The amount of moisture employed in the improved method is less than that required to permit the presence of free water in and about the grain, and only that amount which will serve to soften and loosen the epidermal layer without penetrating the underlying bran coat laminations to such a degree as would result in their separation from the berries with the epidermal layer material. Limitation of the amount of moisture employed during the peeling operation has further practical advantage in that the peeled grain and associated detached, epidermal layer material can be quickly and economically dried and subsequently subjected to air currents or the action of a winnowing fan to complete separation of the detached material from the grain berries.

As shown in Figure 1, the grain to be treated is first fed to a suitable device wherein the individual berries are gently rubbed under moderate pressure applied through one or more resilient, adherescent surfaces, and wherein the degree of moisture necessary to wrinkle and initially detach the epidermal layer material of the grain berries is supplied to the grain in controlled amount as the grain enters and passes through the rubbing device. From the rubbing device the peeled berries and detached epidermal layer material pass in a moist intermingled mass to a suitable drier, wherein the added moisture is removed and the material dried to a condition wherein any material tendency of the detached material to stick or adhere to the peeled berries is eliminated. After drying, the intermingled material is passed to a winnowing fan or similar air treatment adjusted to blow the flaky detached material away from the peeled dry grain, thereby effecting separate recovery of the characteristically-different grain products.

Rubbing devices operable to act on the grain berries in the manner, under the conditions, and to the degree above set forth may be variously constructed, an apparatus of modified rod mill type, such as is shown in the drawing, having been found to be practical and efficient for the purposes sought. A hollow, cylindrical mill shell or barrel is indicated by the numeral 10 and is shown as disposed with its axis substantially horizontal and supported for rotation about its axis by means of rollers 11 engaging with annular tracks provided peripherally and exteriorly of the shell 10, suitable power-driven means, such as a pinion 12, engaging with a ring gear 13 fixed exteriorly of the shell for rotation thereof. The intake end of the shell 10 is shown as substantially closed save for a central aperture through which the discharge end of a feed spout 14 engages for delivery of grain to the interior of the shell 10, and the opposite end of said shell is provided with suitable means, such as a central opening and a plurality of marginal apertures 15, through which the shell contents may be discharged. As shown in Figures 2 and 3, the interior, cylindrical surface of the shell 10 is covered with a lining of resilient, adherescent material indicated by the numeral 16, and the shell is charged with a plurality of cylindrical, metallic rods 17, each covered by a cylindrical envelope 18 of resilient, adherescent material. The shell lining 16 and the rod coverings 18 may be of any specific material suitable to their purpose of peeling away epidermal material from grain berries, and for such purpose it has been determined that the surfaces engaging against the berries should be somewhat yieldable so that the individual grain berries may embed slightly in the surface material, and that said surfaces should be characterized by a tendency to grip and hold epidermal layer material of the berries, thereby operating to peel or slough away the epidermal layer material from the underlying components of the grain berries, and it has been found that rubber is a satisfactory material for the purpose set forth. The rods 17 are provided in such number as will cooperate to form a single layer in rolling contact with the inner shell liner surface without material tendency of the individual rods to cascade or roll on and over adjacent rods during rotation of the mill at the determined speed, and the size and consequent weight of the rods 17 is selected in accordance with the material to be treated and is kept below the minimum weight which would act to crush, crack or break the grain berries passed thereunder. Means are provided for the introduction of moisture to the interior of the shell 10, and such means may take the form of a pipe 19 disposed substantially axially within said shell and communicating through a suitable valve 20 with a source of water, water vapor, steam, or the like, the end of the pipe 19 within the shell preferably being closed and the portion of the pipe within said shell preferably being perforated, as at 21, for escape of the moisture medium to the shell interior.

While it is probable that best peeling results will be obtained when both the rod and shell surfaces in contact with the grain berries are of resilient, adherescent material, it is contemplated that satisfactory and perhaps best results may derive in certain instances from the use of resilient, adherescent material on only one of the attritive surfaces, and such an arrangement is indicated in Figures 4 and 5. In Figure 4 is shown a plurality of rods 17 with their resilient, adherescent envelopes 18 in rolling engagement against a shell liner 22 of smooth metal or equivalent hard, unyielding material, while in Figure 5 is shown a reversed arrangement consisting of smooth, hard, metallic rods 23 disposed with their uncovered hard surfaces in rolling engagement with the resilient, adherescent liner 16.

Successful operation of the improved method for the production of unbroken and undamaged grain berries stripped of their epidermal layers and otherwise retaining their natural conformation requires the presence during the peeling operation of only that amount of moisture which will suffice to wrinkle and initially loosen the epidermal layer or outer woody bran coat of the berries without any excess of free moisture which might act to soften and loosen underlying bran coat laminations or enter with pulping effect into the grain berries. In the case of wheat, which normally carries some six separate bran coat laminations, the outer of the laminations constitutes the epidermal layer which it is desired to remove, and this outer lamination appears to have an absorptive capacity which permits it to take up moisture and react thereto before the moisture has appreciably penetrated the underlying laminations, so long as there is no excess of moisture present or so long as the grain is exposed to the action of moisture only during a time period adjusted to limit the moisture penetration of the berry to the thickness of the epidermal layer. Hence the amount of moisture required is somewhat critical. Less than the proper amount will result in failure to properly condition all of the grain berries for detachment of their epidermal layers, and more than the proper amount will result in detachment and intermingling with the epidermal layers of nutritive bran laminations sought to be retained on the berries, but the natural variation in normal water content in the grain material and in the character and absorptive properties of epidermal layers of different specific grains preclude the determination of the amount of added moisture required, to an exact degree, in advance of trial. However, experience has established that the amount of added moisture should approach that limit beyond which free moisture would be present in the interstices of the grain, and demonstrations would indicate that this limit is approached with a total moisture content, including the natural inherent moisture of the grain, of from 18% to 20% water by weight of grain. Where the grain materials carry an initial water content of from 10% to 13% by weight of grain, the amount of moisture to be added as a prerequisite to peeling of the grain will hence vary below a maximum of 7% to 8%. The additional amount of moisture required for successful practice of the improved method is added to the grain material in such manner as to be present on and in absorbed relation with the epidermal layers of the grain berries at and just prior to the application of attritive influences to said berries, and the required moisture may be supplied to the grain in the form of liquid, steam, water vapor, or otherwise, as may be determined to be most practical in a given instance. The means employed for supply of the required moisture to the grain material may vary in form and specific construction, but such means should be arranged for suitable regulation of the moisture delivered therethrough, to the end that adjustment of the moisture supply to fit the needs of a given operation may be had, and to maintain the exterior surfaces of the grain berries moist and consequently soft during and throughout the rubbing operation employed for detachment of epidermal layer material.

With a normal, average, natural water content of 12% an addition of from 4% to 5% of water is commonly sufficient for successful peeling of the grain, this additional amount being less than will supply an excess of free water on and in the grain.

No particular form or type of apparatus is necessary for the drying and separating phases of the improved method. It is sufficient that the intermingled grain and bran coat material be dried, by the application of heat, or the like, to a condition where the bran coat material is light and flaky, free from material tendency to adhere to grain berries, and where the grain berries themselves have a retained moisture content preferably no greater than normal. After, or perhaps as an incident of the drying operation, the flaky bran coat material is winnowed or blown away from the peeled berries, the latter then being in suitable condition for storage, milling, or other processing to food product form.

As an example of successful practice of the improved method, the following actual demonstration is cited:

A hard red variety of wheat was fed at the rate of three hundred pounds per hour to a small rod mill six feet long and thirty inches in diameter, lined with rubber and enclosing eight rubber covered rods having a maximum diameter of one and one-half inches. The mill was rotated at a speed of fourteen revolutions a minute and moisture was supplied to the mill interior in the form of a fine water spray discharged from a pipe introduced within the mill. The grain was fed dry through a small opening in one end of the mill and discharged through an opening in the opposite mill end. Grain discharged from the mill was substantially free of outer bran coat material, was unbroken and retained all of the germ. The discharged grain mass was dried on a screen by means of warm air currents and the detached material blown away by means of a fan. The weight of the detached and separated bran coat material was 1.7% of the entire weight, and the peeled grain discharged from the mill had a water content of 16.3%. Operation of the same apparatus on dry grain, without the addition of moisture, accomplished no peeling results.

Since many changes, variations, and modifications in the specific details of the improved method, and in the construction and operative relation of the apparatus employed in practice of said method, may be had without departing from the spirit of my invention, I wish to be understood as being limited solely by the scope of the appended claims, rather than by any details of the illustrative showing and foregoing description.

I claim as my invention:

1. The method of detaching the epidermal layer of bran coat material from certain cereal grains without material alteration of the natural grain berry conformation, which consists of moistening the normally dry grain to the degree sufficient to soften and initially loosen the epidermal layer material without the presence of free water in and on the grain, rubbing and rolling the grain berries in maintained, exteriorly-moist condition under and between a single layer of smooth, cylindrical blunging elements of weights less than will crush the berries, maintaining said elements in single layer and loosely disposed in free rolling contact with each other and with a supporting surface, maintaining a cushioning resilient surface between the elements and supporting surface in such manner as to cushion the cereal grain being treated from direct contact with the blunging elements and the supporting surface, and moving the supporting surface in a curvilinear path slowly so as not to cascade the elements, whereby the grain berries are subjected to pressure and friction without impact action.

2. Apparatus for stripping the epidermal layer of bran coat material from certain cereal grains, comprising a cylindrical, hollow shell mounted for rotation about its substantially horizontally-disposed axis, means for rotating said shell, centrally-apertured webs transversely of the opposite ends of said shell, an inclined spout engaging for delivery of grain through the aperture of one of said webs, a valve-controlled pipe leading from a supply of water through the web aperture above said spout to a perforated, otherwise-closed terminal portion axially of and within said shell, a plurality of cylindrical rods of weights less than will crush and break the grain berries loosely disposed as a single layer within and in free rolling engagement against the inner shell surface in such limited number as will obviate cascading of said rods during shell rotation, cushioning resilient surfaces on and covering the interengageable areas of said rods and shell, and a plurality of circumferentially-spaced apertures intersecting the shell web remote from said spout and defining an orbit substantially coincident with that of the interior shell surface.

THEODORE EARLE.